US012611990B2

(12) United States Patent
He et al.

(10) Patent No.: US 12,611,990 B2
(45) Date of Patent: Apr. 28, 2026

(54) COMMERCIAL VEHICLE CAMERA MONITOR SYSTEM WITH TRAILER WHEEL BASE ESTIMATION

(71) Applicant: Stoneridge Electronics AB, Solna (SE)

(72) Inventors: Yu He, Dearborn Heights, MI (US);
Liang Ma, Rochester, MI (US);
Utkarsh Sharma, Farmington Hills, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 0 days.

(21) Appl. No.: 18/731,827

(22) Filed: Jun. 3, 2024

(65) Prior Publication Data

US 2025/0368134 A1     Dec. 4, 2025

(51) Int. Cl.
| | |
|---|---|
| *B60R 1/26* | (2022.01) |
| *G06T 7/70* | (2017.01) |
| *G06V 20/56* | (2022.01) |
| *H04N 7/18* | (2006.01) |

(52) U.S. Cl.
CPC ................. *B60R 1/26* (2022.01); *G06T 7/70* (2017.01); *G06V 20/56* (2022.01); *H04N 7/181* (2013.01); *B60R 2300/105* (2013.01); *B60R 2300/20* (2013.01); *B60R 2300/8086* (2013.01); *G06T 2207/30241* (2013.01); *G06T 2207/30244* (2013.01); *G06T 2207/30252* (2013.01)

(58) Field of Classification Search
CPC ....................................... B60R 1/26
USPC ........................................ 348/148
See application file for complete search history.

(56) References Cited

U.S. PATENT DOCUMENTS

| | | | |
|---|---|---|---|
| 12,115,917 | B2 | 10/2024 | Wei et al. |
| 12,269,544 | B2 | 4/2025 | Gudarzi et al. |
| 2014/0085472 | A1 | 3/2014 | Lu et al. |
| 2014/0297128 | A1 | 10/2014 | Lavoie et al. |
| 2017/0341583 | A1 | 11/2017 | Zhang et al. |

(Continued)

FOREIGN PATENT DOCUMENTS

| | | |
|---|---|---|
| DE | 102010006521 A1 | 9/2010 |
| EP | 4105596 A1 | 12/2022 |

(Continued)

OTHER PUBLICATIONS

International Search Report for International Application No. PCT/US2022/052637 dated Apr. 24, 2023.

(Continued)

*Primary Examiner* — Amir Shahnami
(74) *Attorney, Agent, or Firm* — Carlson, Gaskey & Olds, P.C.

(57) ABSTRACT

A method for determining wheel base for a trailer attached to a tractor includes a) identifying a two-dimensional trailer wheel location in an image, b) associating the two-dimensional trailer wheel location with a corresponding trailer angle, c) converting the two-dimensional trailer wheel location to a three-dimensional trailer wheel location, d) calculating a wheel base from the three-dimensional trailer wheel location, e) acquiring a new two-dimensional trailer wheel location, f) performing steps b)-d) for the new two-dimensional trailer wheel location, and g) calculating an average wheel base based upon a previous average wheel base and the new two-dimensional trailer wheel location.

20 Claims, 7 Drawing Sheets

(56) References Cited

U.S. PATENT DOCUMENTS

| | | | |
|---|---|---|---|
| 2018/0043933 A1 | 2/2018 | Hu et al. | |
| 2018/0056868 A1 | 3/2018 | Naserian et al. | |
| 2018/0299352 A1* | 10/2018 | Rose | G06T 7/0002 |
| 2018/0319437 A1 | 11/2018 | Hu et al. | |
| 2020/0031276 A1 | 1/2020 | Noh | |
| 2020/0142405 A1 | 5/2020 | Havens et al. | |
| 2020/0143174 A1 | 5/2020 | Luo et al. | |
| 2021/0061353 A1 | 3/2021 | Miller et al. | |
| 2021/0394686 A1 | 12/2021 | Germaine et al. | |
| 2022/0169261 A1 | 6/2022 | Kollberg et al. | |
| 2023/0415746 A1 | 12/2023 | Ghandriz et al. | |
| 2024/0087159 A1 | 3/2024 | Wei et al. | |
| 2024/0416837 A1 | 12/2024 | Wei et al. | |

FOREIGN PATENT DOCUMENTS

| | | | |
|---|---|---|---|
| JP | 2014002056 A | 1/2014 | |
| WO | 2020207572 A1 | 10/2020 | |
| WO | 2022027063 A1 | 2/2022 | |
| WO | 2023121911 A1 | 6/2023 | |
| WO | 2023192072 A1 | 10/2023 | |

OTHER PUBLICATIONS

International Search Report and the Written Opinion for International Application No. PCT/US2023/032389 dated Dec. 15, 2023.
Caup Lukas et al.: "Video-based Trailer Detection and Articulation Estimation" 2013 IEEE Intelligent Vehicles Symposium (IV), IEEE, Jun. 23, 2013 (Jun. 23, 2013), pp. 1179-1184, XP032502039, ISSN: 1931-0587, DOI: 10,1109/IVS.2013.6629626.
European Search Report for Application No. 22177585.1 completed on Oct. 26, 2022.
European Search Report for European Application No. 25179933.4 mailed Oct. 16, 2025.

* cited by examiner

COMMERCIAL VEHICLE CAMERA MONITOR SYSTEM WITH TRAILER WHEEL BASE ESTIMATION

TECHNICAL FIELD

This disclosure relates to a camera monitor system (CMS) with trailer wheel base estimation using image-based wheel location tracking.

BACKGROUND

Camera monitor systems, such as camera systems for supplementing mirror views, are utilized in commercial vehicles to enhance the ability of a vehicle operator to see a surrounding environment. Camera monitor systems (CMS) utilize one or more cameras to provide an enhanced field of view to a vehicle operator. In some examples, the camera monitor systems cover a larger field of view than a conventional mirror, or include views that are not fully obtainable via a conventional mirror.

Semi-automated driver-assist systems, camera monitor systems, electronic stability program systems, and other vehicle systems, use or require knowledge about the location of various vehicle features throughout operation of the vehicle. Among those features can be a real-world position or a position in an image of one or more of the rear wheels of the trailer. Systems exist for identifying the position of the trailer wheel(s) using image processing while it is visible within the field of view of a rear-facing camera. The wheel position can then be used to estimate the trailer wheel base, which enables enhanced CMS functionality such as providing a trailer trajectory overlay onto displayed images.

Some methods for determining the trailer wheel position accurately require a large data set and consequently a large memory for storage of the data set. Additionally, the algorithms used to process the data set are relatively computationally slow.

SUMMARY

A method for determining wheel base for a trailer attached to a tractor includes a) identifying a two-dimensional trailer wheel location in an image, b) associating the two-dimensional trailer wheel location with a corresponding trailer angle, c) converting the two-dimensional trailer wheel location to a three-dimensional trailer wheel location, d) calculating a wheel base from the three-dimensional trailer wheel location, e) acquiring a new two-dimensional trailer wheel location, f) performing steps b)-d) for the new two-dimensional trailer wheel location, and g) calculating an average wheel base based upon a previous average wheel base and the new two-dimensional trailer wheel location.

In a further example of the foregoing, step a) is performed using a rear-facing camera that is mounted to a side of a tractor, and the image is provided by the rear-facing camera. Step e) is performed using the same rear-facing camera.

In a further example of the foregoing, step b) is performed based upon a kinematic model.

In a further example of the foregoing, step b) includes referencing a steering wheel angle with the tractor in a forward gear.

In a further example of the foregoing, the method includes a step of filtering the two-dimensional trailer wheel location based upon an expected range of wheel locations for the trailer angle.

In a further example of the foregoing, the filtering step is performed between step b) and step c).

In a further example of the foregoing, step e) includes storing the new two-dimensional trailer wheel location in memory, and includes a step of permitting the stored new two-dimensional trailer wheel location to be overwritten immediately subsequent to performing step g).

In a further example of the foregoing, the method includes a step of displaying a trailer trajectory based upon the average wheel base.

In a further example of the foregoing, steps b)-g) are performed repeatedly during a single turn of the trailer, and the step of displaying a trailer trajectory is based upon the average wheel base from the single turn.

In a further example of the foregoing, step b)-g) are performed independently using each of first and second rear-facing cameras that are mounted to a side of a tractor that provides a first average wheel base that is associated with the first rear-facing camera and provides a second average wheel base that is associated with the second rear-facing camera. The method further includes a step of comparing the first and second average wheel bases to one another to determine a positional accuracy of at least one of the first and second rear-facing cameras.

A camera monitor system (CMS) for determining wheel base for a trailer attached to a tractor includes multiple rear-facing cameras that are configured to capture multiple fields of view in proximity to the trailer, multiple displays that are configured to display images from the captured multiple fields of view, a sensor that is configured to provide information relating to a trailer angle, a controller that is in communication with the multiple cameras, the multiple displays and the sensor. The controller includes a memory that has vehicle configuration parameters, a kinematic model and a trailer wheel location determination module. The controller is programmed to perform a trailer wheel base estimation including the steps of a) identifying a two-dimensional trailer wheel location in an image of one of the multiple fields of view, b) associating the two-dimensional trailer wheel location with a corresponding trailer angle, c) converting the two-dimensional trailer wheel location to a three-dimensional trailer wheel location, d) calculating a wheel base from the three-dimensional trailer wheel location, e) acquiring a new two-dimensional trailer wheel location, f) performing steps b)-d) for the new two-dimensional trailer wheel location, and g) calculating an average wheel base based upon a previous average wheel base and the new two-dimensional trailer wheel location.

In a further example of the foregoing, step a) is performed using one of the multiple rear-facing cameras which is mounted to a side of a tractor, and the image is provided by the one of the multiple rear-facing cameras, and step e) is performed using the same one of the multiple rear-facing cameras.

In a further example of the foregoing, step b) is performed based upon the kinematic model.

In a further example of the foregoing, step b) includes referencing a steering wheel angle from the sensor with the tractor in a forward gear.

In a further example of the foregoing, the controller performs a step of filtering the two-dimensional trailer wheel location based upon an expected range of wheel locations for the trailer angle.

In a further example of the foregoing, the filtering step is performed between step b) and step c).

In a further example of the foregoing, step e) includes storing the new two-dimensional trailer wheel location in the memory. The controller permits the stored new two-dimensional trailer wheel location to be overwritten immediately subsequent to performing step g).

In a further example of the foregoing, the controller performs a step of displaying on one of the multiple displays a trailer trajectory based upon the average wheel base.

In a further example of the foregoing, steps b)-g) are performed repeatedly during a single turn of the trailer, and the step of displaying a trailer trajectory is based upon the average wheel base from the single turn.

In a further example of the foregoing, step b)-g) are performed independently using each of first and second rear-facing cameras of the multiple rear-facing cameras which are mounted to a side of a tractor. A first average wheel base associated with the first rear-facing camera is calculated, and a second average wheel base associated with the second rear-facing camera is calculated. The controller performs a step of comparing the first and second average wheel bases to one another to determine a positional accuracy of at least one of the first and second rear-facing cameras.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
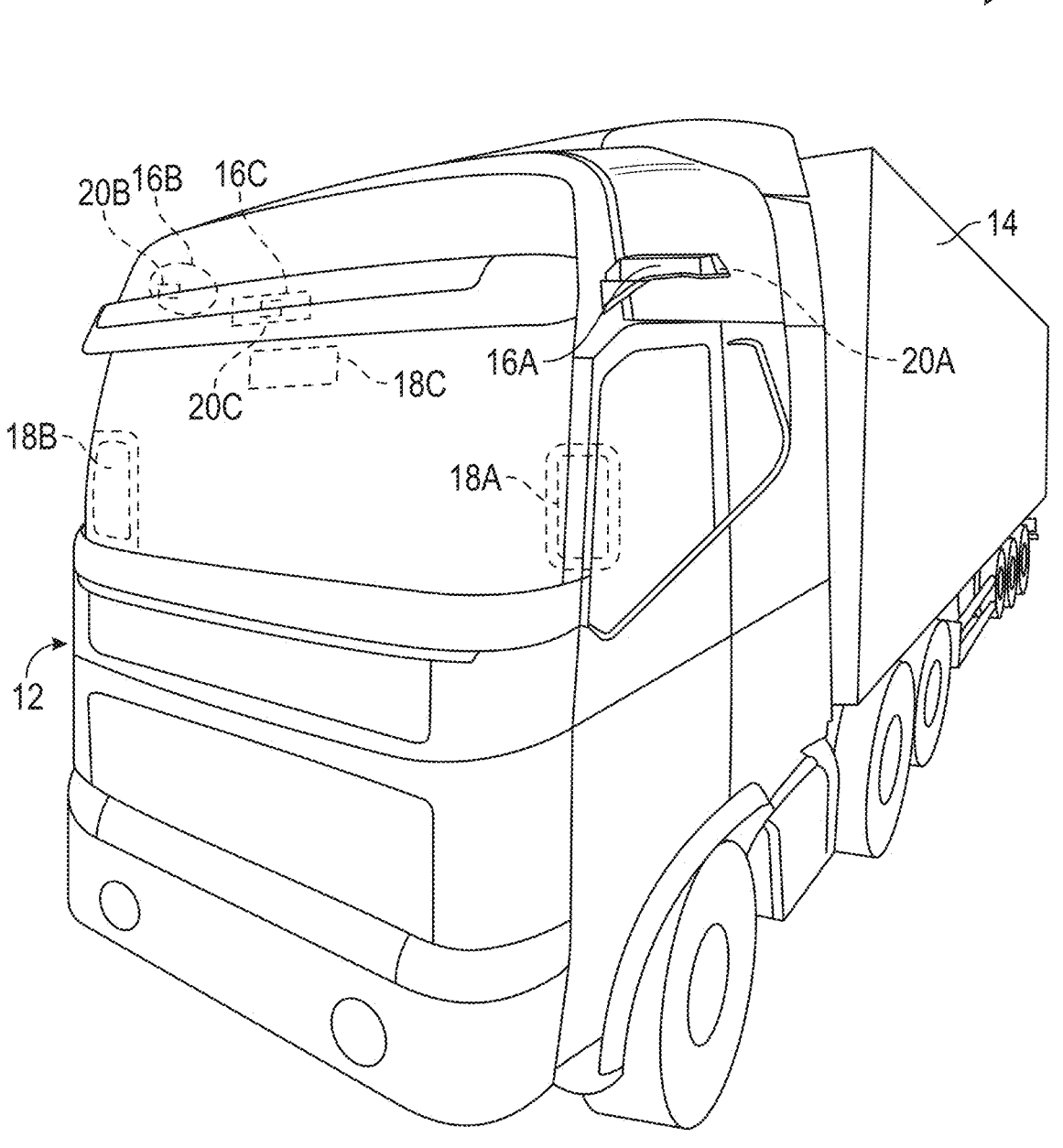
FIG. 1 is a schematic front view of a commercial truck with a camera monitor system (CMS) used to provide at least Class II and Class IV views.
Figure 2:
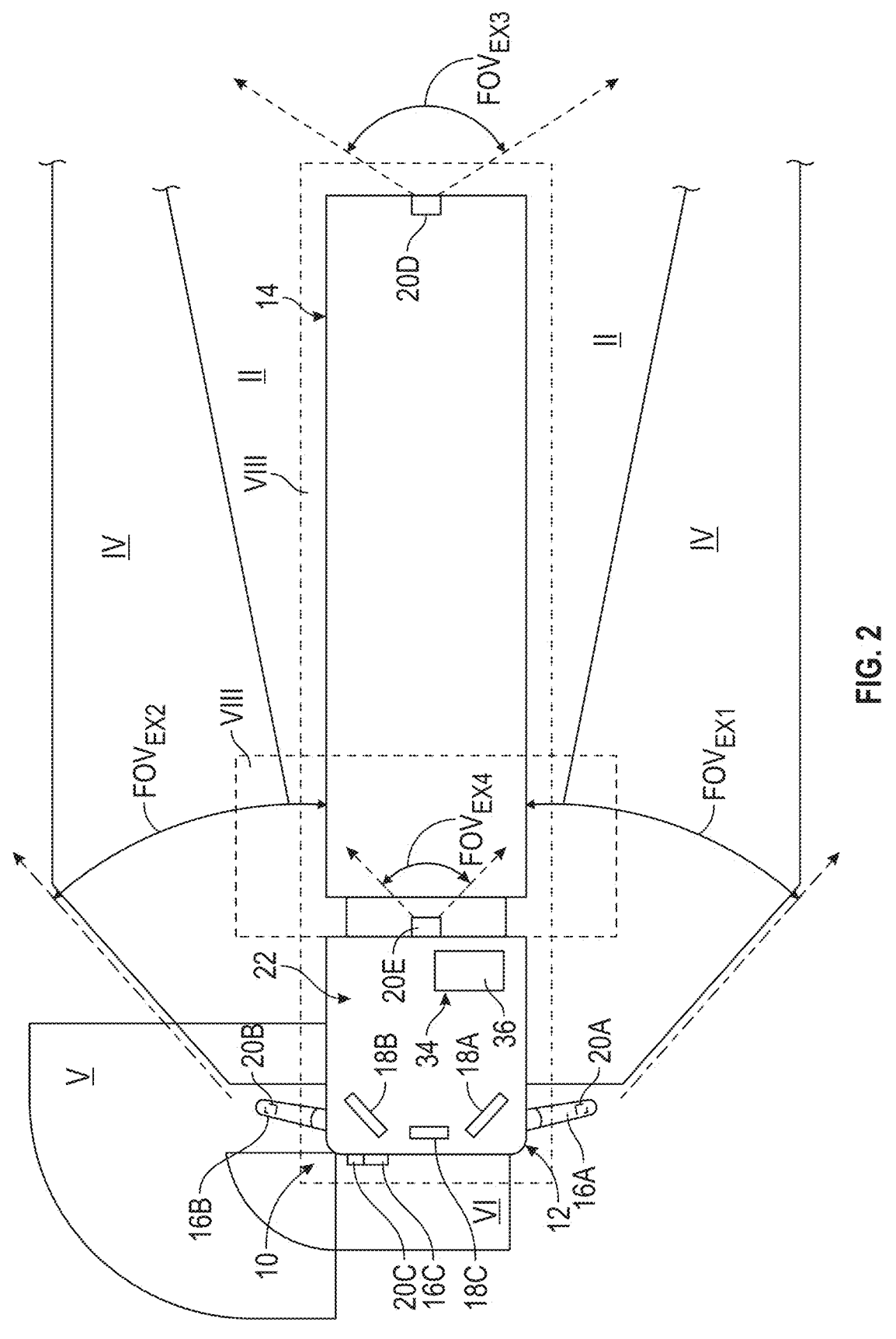
FIG. 2 is a schematic top elevational view of a commercial truck with a CMS providing Class II, Class IV, Class V and Class VI views.
Figure 3:
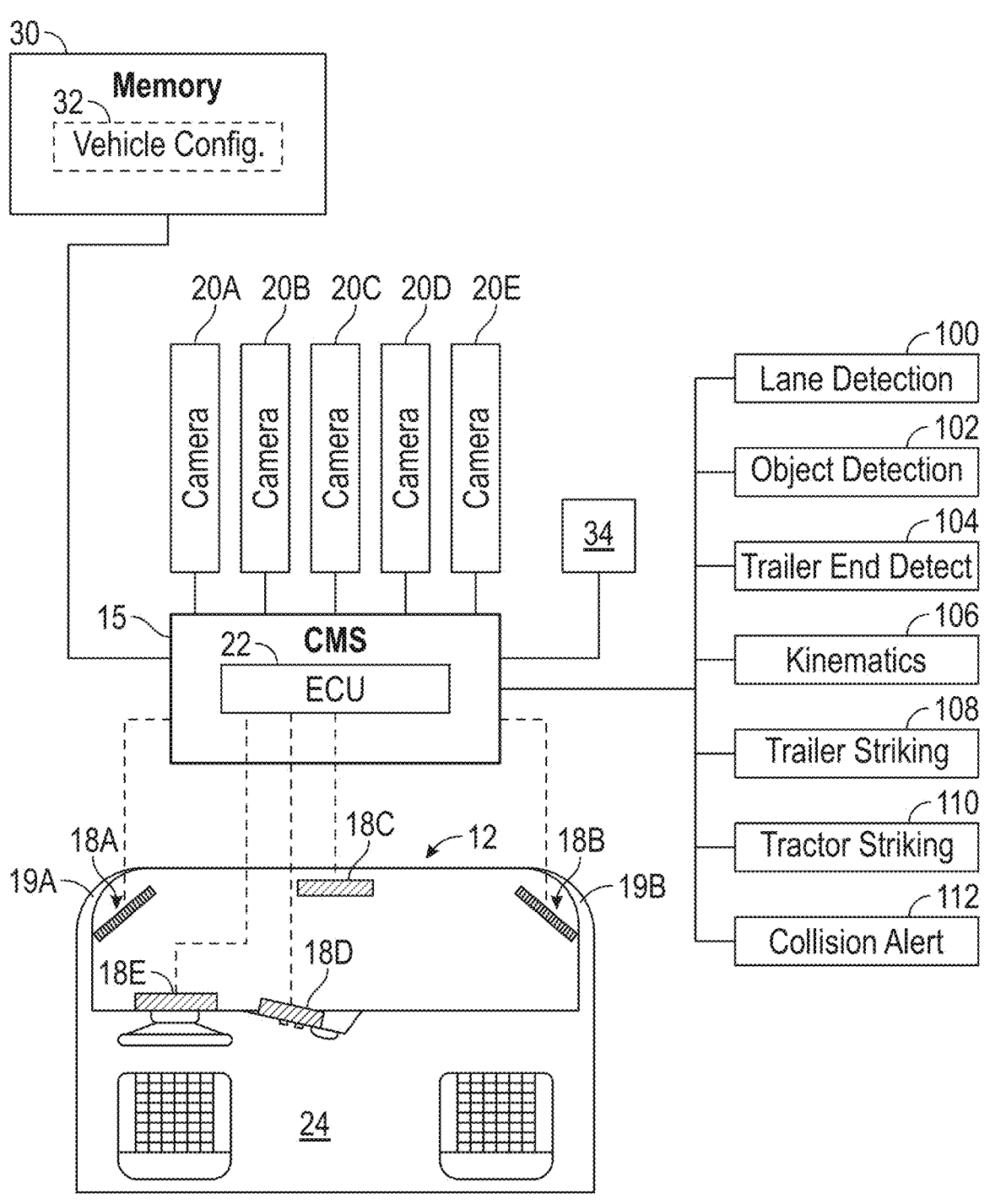
FIG. 3 is a schematic top perspective view of a vehicle cabin including displays.

Schematic views of a commercial vehicle 10 are illustrated in FIGS. 1-3. The commercial vehicle 10 includes a vehicle cab or "tractor" 12 for pulling a trailer 14, where the trailer 14 articulates with respect to the tractor 12 during turns. Although the commercial vehicle 10 is depicted as a commercial truck with a single trailer in this disclosure, it is understood that other commercial vehicle configurations may be used (e.g., different types or quantities of trailers).

A pair of camera arms 16A-B include a respective base that is secured to, for example, the tractor 12. A pivoting arm is supported by the base and may articulate relative thereto. At least one rearward facing camera 20A-B is arranged respectively on or within the camera arms 16A-B. Fixed wings may also be used instead of folding camera arms. The exterior cameras 20A-B respectively provide an exterior field of view $FOV_{EX1}$, $FOV_{EX2}$ that each include at least one of Class II and Class IV views (FIG. 2), which are representative of legally prescribed views in the commercial trucking industry.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries may have similar driver visibility requirements for commercial trucks. Any reference to a "Class" view is not intended to be limiting, but is intended as an example of the type of view provided to a display from a particular camera. For example, certain views may be prescribed in SAE J3155 or other regulations.

Each camera arm 16A-16B may also provide a housing that encloses electronics, e.g., a controller, that are configured to provide various features of the CMS 15. The camera arms 16A-B may be mounted either at a roof-mount location over the cab door (as shown), or on a door-mounted bracket or station, for example. If desired, the camera arms 16A-B may include conventional mirrors integrated with them as well, although the CMS 15 may be used to entirely replace mirrors. In additional examples, each side can include multiple camera arms, with each arm housing one or more cameras and/or mirrors.

If video of Class V and/or Class VI views is also desired, a camera housing 16C and camera 20C may be arranged at or near the front of the commercial vehicle 10 to provide those views (FIG. 2). Generally, Class V covers a passenger side of the vehicle from a passenger vehicle cab corner aftward along a cab of the vehicle, and Class VI covers a passenger side of the vehicle from a passenger vehicle cab corner along a front of a cab of the vehicle.

A backup camera 20D may be provided which provides a field of view $FOV_{EX3}$. The backup camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor 12 and that provides a field of view $FOV_{EX4}$. The fifth wheel camera 20E may be mounted anywhere between the lateral plane of the fifth wheel fixture and the top/roof edge of the tractor, for example.

FIG. 3 is a schematic top view of an example vehicle cabin interior 24. With continuing reference to FIGS. 1-3, electronic displays 18A-E (e.g., which may be video displays, such as LCD displays) and cameras 20A-E are shown. The various electronic displays 18A-E and cameras 20A-E are part of a camera monitor system (CMS) 15, and therefore act as CMS displays and CMS cameras. As used herein, a "CMS camera" 20 is a camera configured to record images of an environment surrounding a commercial vehicle 10, and a "CMS display" 18 is an electronic display (e.g., an LCD, touchscreen, etc.) that is configured to image or display feeds from those cameras.

The CMS 15 includes a CMS controller or electronic control unit (ECU) 22 that acts as a controller and includes processing circuitry that supports operation of the CMS 15. The CMS ECU 22 is operatively connected to memory 30 (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The CMS displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). In the example of FIG. 3, additional displays 18C-E are provided. Display 18C is arranged in the vehicle cabin interior 24 near the top center of the windshield may be used to display the Class V and Class VI views, which are toward the front of the commercial vehicle 10, or a backup camera view (from camera 20D or 20E) to the driver. Display 18D is provided in a center console area of the vehicle cabin interior 24, generally located centrally in a bottom half of the vehicle cabin, and may be used for other purposes, such as navigation, infotainment, etc (i.e., a secondary information display). Display 18E may be part of an instrument cluster (i.e., a primary information display) located behind the steering wheel, for example.

If video of Class VIII views is desired, camera housings can be disposed at the sides and rear of the commercial vehicle 10 to provide fields of view including some or all of the Class VIII zones of the commercial vehicle 10. In such examples, one of the displays 18C-E may include one or more frames displaying the Class VIII views. The displays 18A, 18B, 18C face a driver region within the vehicle cabin interior 24 where an operator is seated on a driver seat.

In various examples, the ECU 22 includes one or modules having algorithm(s), equation(s) and/or decision manager(s) that receive input(s) from sensors (e.g., cameras 20A-20E, ultrasonic, LiDar, radar, etc.) and/or stored values, as schematically illustrated in FIG. 3. Example modules include Lane Detection Module 100, Object Detection Module 102, Trailer End Detection Module 104, Kinematic Module 106, Trailer Striking Area Prediction Module 108, Tractor Striking Area Prediction Module 110, and Collision Alert Module 112. Example inputs include one or more sensors 34, such as a steering angle sensor, a vehicle speed sensor, gear position sensor, and/or other sensor data. Vehicle configuration information 32, which may be stored in memory 30, relates to vehicle characteristics (e.g., trailer length, axle position, trailer type/wheelbase, tractor configuration/wheelbase, hitch point location, camera intrinsics and extrinsics, etc.), provided by the manufacturer, operator, and/or determined by one or more of the modules. During vehicle operation, the ECU 22 may communicate information to the driver, fleet operator, or others using an output (e.g, displays 18, speaker, etc.). Example operation and uses of these modules are disclosed in International Application No. PCT/US2023/083416 filed on Dec. 11, 2023, entitled "CAMERA MONITOR SYSTEM WITH TRAILER CURB STRIKE ALERT AND TRAILER STRIKING AREA," which is incorporated herein by reference in its entirety.

The lane detection module 100 also uses image processing of the captured images to identify markings on the roadway, such as lane markers that visually divide adjacent lanes. One example algorithm is described in United States Publication No. US2023/117,719, entitled "CAMERA MIRROR SYSTEM DISPLAY FOR COMMERCIAL VEHICLES INCLUDING SYSTEM FOR IDENTIFYING ROAD MARKINGS", which is incorporated by reference in its entirely. In that publication, a lane detection module is described in which an object detection algorithm identifies a lane marking in a roadway by filtering a color of the lane marking from a surrounding portion of the captured image. Other techniques based upon deep learning technology or another computer vision method may be used, if desired.

The object detection module 102 includes one or more image processing algorithms configured to identify objects in the captured images. The algorithms may be used to identify VRU's (e.g., pedestrians or cyclists), attributes of the tractor 12 and/or trailer 14, other vehicles, signs, curbs, trees, buildings and/or other inanimate objects.

The trailer end detection module 104 is another image processing module that extracts one or more trailer features from the captured images to determine the location of the end of the trailer in 3D space. These extracted attributes can be used to detect objects such as tractor wheels, trailer edges and other features. Example wheel detection algorithm techniques are disclosed in United States Publication No. US2023/202,394 entitled "CAMERA MONITOR SYSTEM FOR COMMERCIAL VEHICLES INCLUDING WHEEL POSITION ESTIMATION", which is incorporated herein by reference in its entirety. Example trailer edge detection algorithm techniques are disclosed in United States Publication No. US2023/125,045 entitled "TRAILER END TRACKING IN CAMERA MONITORING SYSTEM", which is incorporated herein by reference in its entirety. Other techniques may be used, if desired.

In one example operation, the CMS 15 utilizes the kinematics module 106 to predict a striking zone of the trailer 14 based upon the trailer's trajectory during a turn operation. A two-dimensional overlay may be generated that is digitally imposed over at least one of the displayed Class II/IV images thereby showing the vehicle operator an expected striking zone of the trailer 14 and allowing the vehicle operator adjust the vehicle operations accordingly. The CMS 15 uses the received captured images from the cameras 20A, 20B, as well as any other cameras and vehicle operation data received from a general vehicle controller through a data connection, such as a CAN or LIN bus, to estimate a predicted position of the tractor and/or trailer side at each of multiple side positions and multiple points in time. These positions are converted to a geometric area encompassing all the positions. In this way, the shape and size of the geometric area is not fixed, but rather reflects an actual predicted striking area of the trailer.

In order to avoid accidental strikes, the striking area prediction system uses the vehicle data (e.g., steering angle, steering rate, trailer angle, vehicle speed, trailer wheelbase, tractor wheelbase, hitch point location, yaw rate and the like) to generate a predicted striking zone over time. The predicted striking zone is a prediction of the path the trailer will take over the course of the turn and is re-calculated continuously as the turn progresses. The trailer striking area is also useful in a potential "curve cut" scenario when the vehicle 10 is traveling down a curved roadway. In a curvy road, it becomes more likely for the trailer end to cross the lane markers. indicating boundaries to adjacent lanes, creating a potentially dangerous situation.

The CMS 15 includes a Decision Manager or Collision Alert Module 112 that communicates with the modules 100-110 to evaluate the proximity between the predicted tractor and/or trailer paths (i.e., the tractor and trailer striking areas) and one or more objects (e.g., predicting an imminent curb strike, curve cut, object collision etc.). The decision manager considers the estimated time to the event, severity (what the object is), closing rate between objects, etc. and may provide an overlay and/or alert.

While various overlays and alerts may useful in increasing operator awareness and enhancing safety, it is desirable to provide the operator with information to more easily and proactively manage the vehicle to safely navigate through its surroundings.

Figure 4:
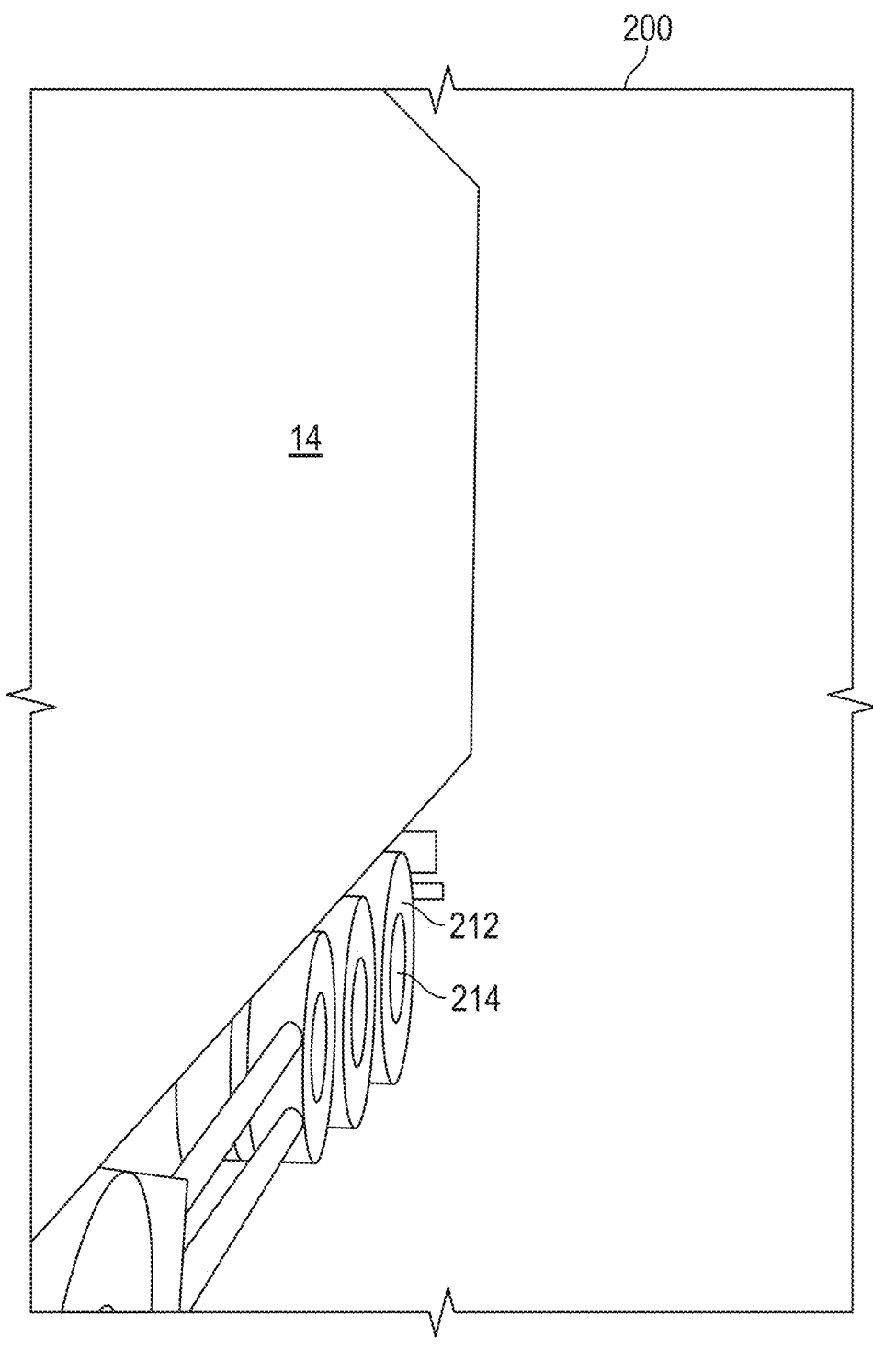
FIG. 4 illustrates a CMS view including a single view of a vehicle trailer at a mid to large trailer angle.
Figures 5A, 5B:
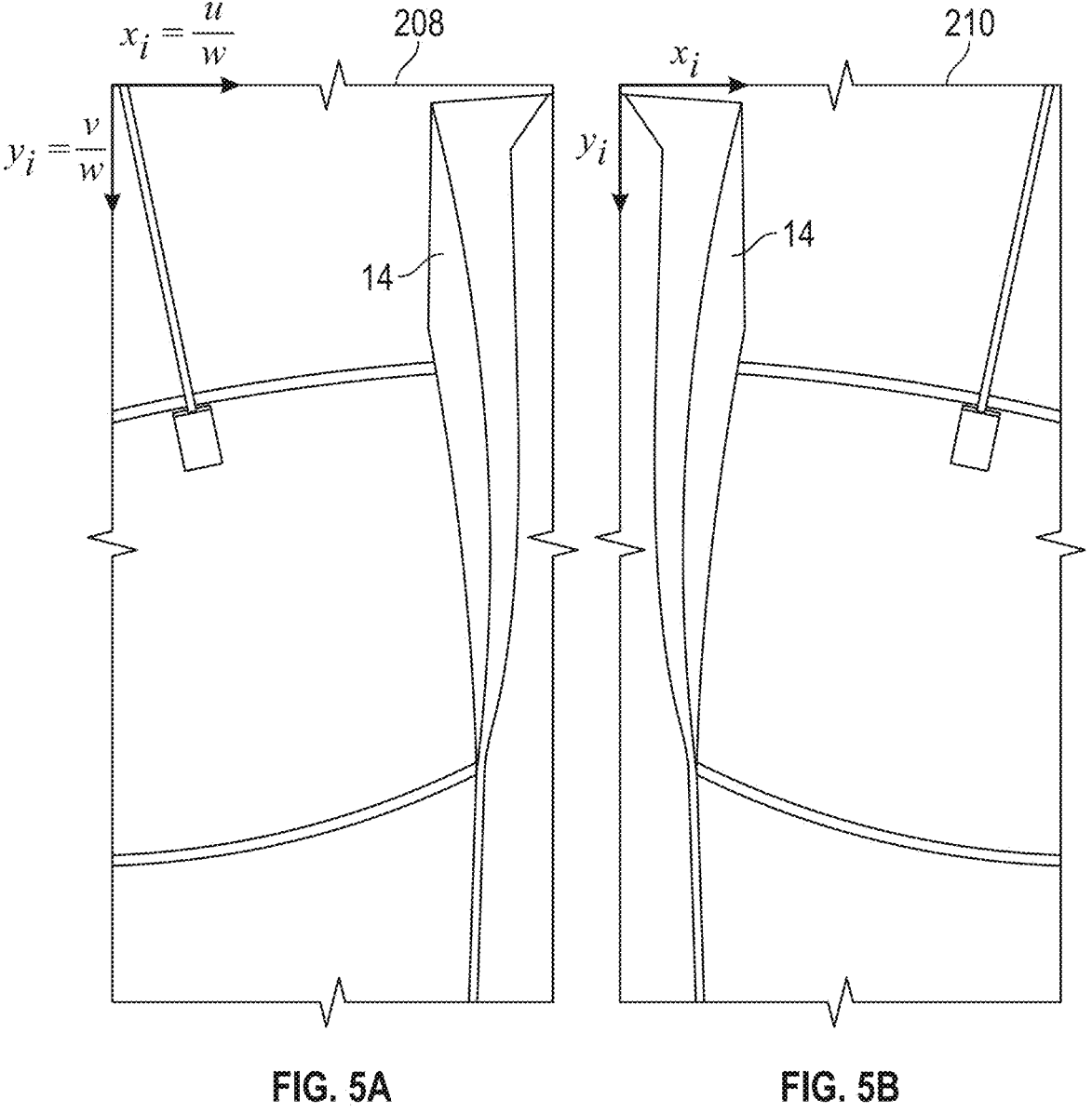
FIGS. 5A and 5B illustrate a CMS view including two views of a vehicle trailer at a low trailer angle.

FIG. 4 schematically illustrates a rear view 200 displayed to a vehicle operator via the CMS described above, while the trailer 14 is at a mid to large (e.g., greater than 10 degree) angle in which a rearmost wheel 212 is visible. Existing image processing techniques can identify the wheel 212 when it is visible and track the center point 214 of the wheel 212 as it travels through the image. In order to facilitate vehicle systems relying on the wheel position or location, such as advanced driver assistance systems, camera monitor systems, electronic stability programs, and similar vehicle systems, the CMS 15 monitors the left- and right-hand views 208, 210 captured by its respective camera(s) (FIGS. 5A and 5B, respectively) and identifies the wheel position during any operating condition where the wheel is visible. The CMS 15 then uses the wheel location information for predicting trailer trajectory, for example, using the kinematics module 106.

Figure 6:
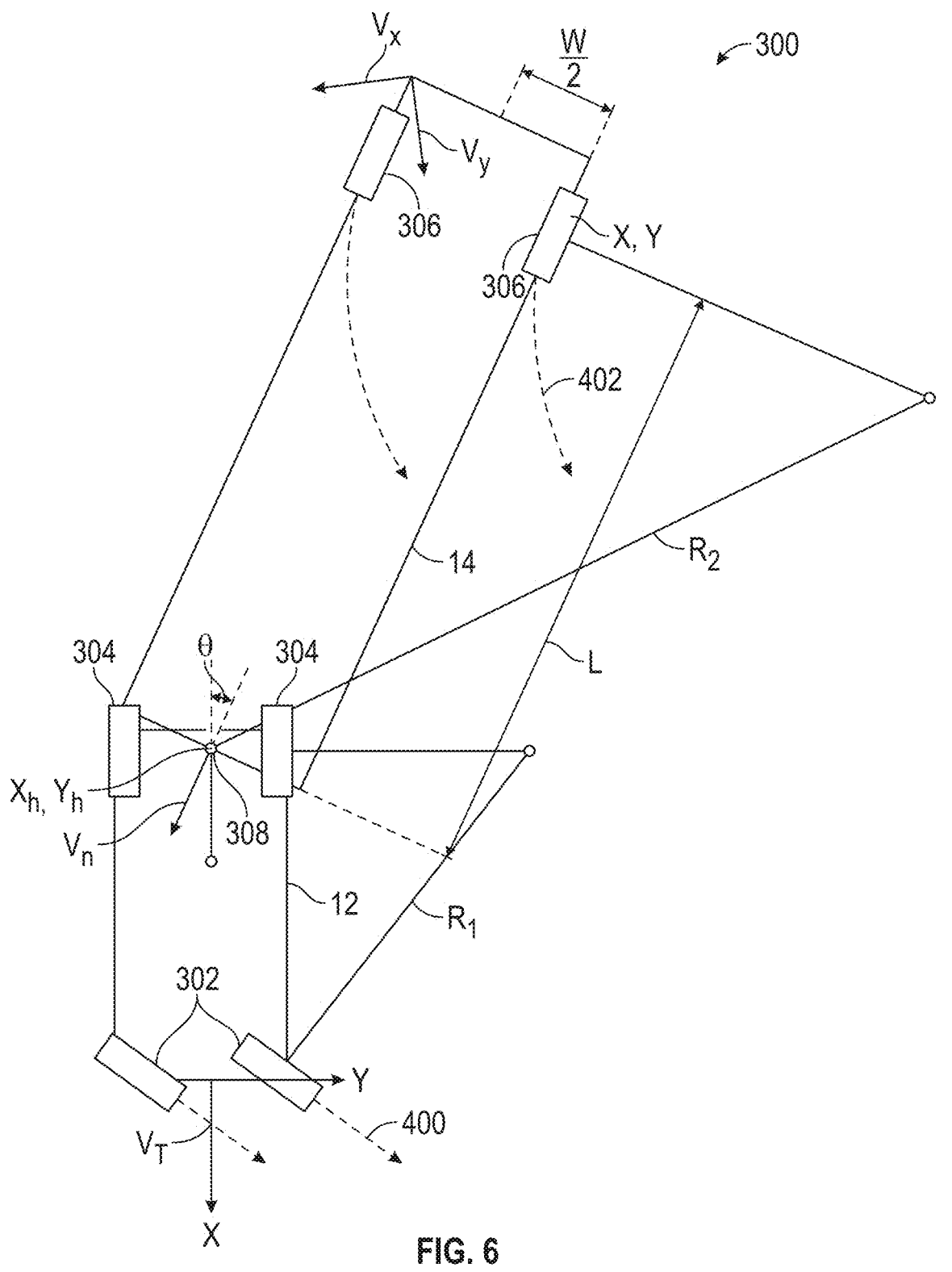
FIG. 6 depicts a kinematics model for each of the tractor and trailer.

One example kinematics module 106 is schematically represented in FIG. 6 models a tractor rotational radius R1 and a trailer rotational radius R2, which are provided by separate, different radii. The tractor 12 has front wheels 302 and rear wheels 304. The kinematics model 300 models the front wheels 302 in a manner that takes into consideration its Ackerman steering characteristics, which is a common steering geometry approach that allows the outside and inside wheels to travel in different radial paths to reduce tire scrub. The trailer 14, which is connected to the tractor 12 at a hitch point 308 (i.e., fifth wheel), has rear wheels 306. $V_T$ is the tractor velocity (corresponding to vehicle speed N, at 34 in FIG. 2), and $V_n$ is the trailer velocity in its longitudinal direction. $V_y$ is the velocity of the trailer end in the same direction as the tractor direction of travel, and $V_x$ is the velocity component of the trailer end in a direction transverse to $V_y$. The trailer angle θ, which is the angle between the trailer 14 and the tractor 12, can be determined in a variety suitable approaches. In one example, trailer angle is calculated with kinematic model during forward driving and is estimated with image processing method during reverse driving. Another method may use LiDAR point cloud to calculate trailer angle and dimensions. Still another method could be a relative/absolute angular position sensor mounted at the hitch location.

In one example kinematics model 300, the vehicle 10 is simplified by using two bicycle, or half-track, models. That is, all wheels need not be represented in the model. Said another way, the bicycle model, which is used as kinematics model in the Kinematic Module 104 is a simplified representation of a four wheeled vehicle. Just the inside wheels of a turning maneuver can be modeled, as that is the side of the vehicle 10 that is most at risk of a collision. It is used to predict the pose of the vehicle 10 using the instantaneous position, angles, velocities and accelerations acting on/in the system. Additionally, it is assumed in this kinematics model that all slip angles are zero. As a result, a vehicle component's (e.g., wheel location and/or trailer end) speed and future displacement can be propagated through the mathematical algorithm very quickly. Additionally, only the trailer angle, the vehicle speed and the steering angle are needed as inputs, which provides a simple, precise, quick approach to path prediction.

The disclosed kinematics model is provided by a first bicycle model with Ackerman steering indicative of a predicted tractor path 400. A second bicycle model is connected to the first bicycle model by the hitch point 308, where the second bicycle model is indicative of a predicted trailer path 402. The path of the inside tractor and trailer wheels are respectively the inner boundary of their respective tractor and trailer paths 400, 402.

The kinematics module 106 receives current trailer angle, steering angle, and vehicle speed to calculate the predicted tractor and trailer paths 400, 402. If desired, one or both of the predicted tractor and trailer paths 400, 4002 can be illustrated on one or more of the displays 18 as overlays (e.g., on at least one of the Class II (narrow) and Class IV (wide) views) to assist the driver in maneuvering the vehicle 10. In one example, the kinematics algorithm is executed (i.e., calculated) continually while driving.

In order to facilitate vehicle systems relying on the wheel position or location, such as advanced driver assistance systems, camera monitor systems, electronic stability programs, and similar vehicle systems, the CMS 15 monitors the views 208, 210 (FIGS. 5A and 5B) and identifies the wheel position 212 during any operating condition where the wheel 212 is visible. Existing object tracking systems can identify the wheel 212 when it is visible and track the center point 214 of the wheel 214 as it travels through the 2D image. The position in the 2D image can then be translated to a real world 3D position using known systems.

Figures 7, 8, 9, 10:
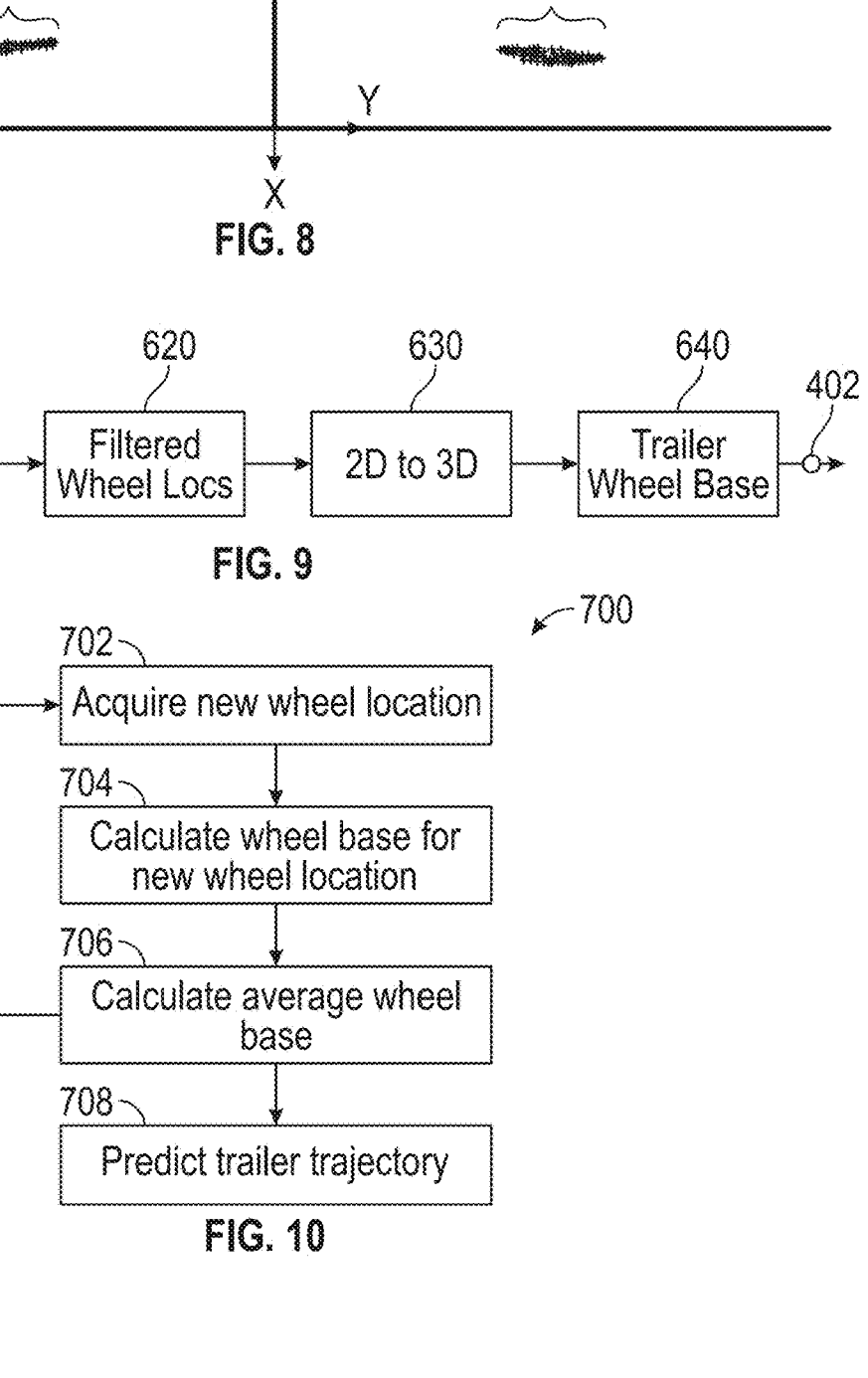
FIG. 7 illustrates a data set of trailer wheel positions within the image(s).
FIG. 8 illustrates the data set of FIG. 7 based upon a kinematic model.
FIG. 9 illustrates a process for determining a trailer wheel base using identified image-based trailer wheel positions.
FIG. 10 depicts a method of accurately and efficiently determining trailer wheel base using multiple image-based trailer wheel positions.

The wheel positions 500 identified by image processing are shown in FIG. 7. Points 502 are wheel positions from forward of the center point 214, and points 504 are wheel positions from rearward of the center point 214. The disclosed method 600 for determining trailer wheel base is shown in FIG. 9. The method 600 identifies individual two-dimensional trailer wheel locations 500 in an image (e.g., FIGS. 5A and/or 5B) and calculates a moving average of the wheel locations 500 to calculate an average trailer wheel base (see 706, FIG. 10), which may be used to determine the trailer trajectory 402, for example.

An example trailer wheel base calculation method 600 is shown in FIG. 9. Initially, raw wheel locations 500 (illustrated in FIG. 7) are provided to the ECU 22 for processing one-by-one, although more than one wheel location may be stored at one time, if desired. However, large data sets need not be stored using the disclosed methods 600 and 700. The raw wheel locations 500 are generated using any upstream wheel detection process or algorithm, and each wheel location is associated with a corresponding trailer angle θ. The trailer angle θ may be computed based on the wheel location within the image; however, the trailer angle can be computed using any conventional trailer angle computation method including trailer angle sensors, tractor-trailer kinematic models, image-based detection, a combination of sensor and image based detection, or any other conventional detection method.

The kinematic model 610 is the geometric framework the provides the spatial relationships between the cameras, the tractor, the trailer and its wheels. In one example, the tractor-trailer angle is calculated with a kinematic model that only uses tractor forward driving operation, and this angle is used to filter out the wheel location detections that is not reasonable (i.e., the angle formed by the detected wheel location and the anchor point on the tractor should be close to resulted kinematic angle). To avoid false wheel detections, the ECU 22 performs a step of filtering the two-dimensional trailer wheel location (block 620) based upon an expected range of wheel locations for the trailer angle θ, if desired. The plausibility check uses the kinematic model 610 to determine a ground truth trailer angle and compares the ground truth trailer angle to the received raw wheel position and trailer angle. When the angle determined via the kinematic model 610 differs from the received angle by at least a certain amount, a false positive is detected. False positives correspond to wheel locations that are not possible and/or not probable given the known information inputs (e.g., speed, steering angle, grade, etc.) and the determined information outputs (e.g., trailer angle) from the kinematic model 610. An example of filtered wheel locations are shown at 506, 508 in FIG. 8.

After generating a filtered wheel location 620, the process 600 applies a performs a 2D to 3D conversion in which the two-dimensional trailer wheel location in the captured image is converted to a three-dimensional trailer wheel location in the real world. One example technique for converting the two-dimensional trailer wheel location to a three-dimensional trailer wheel location (block 630) is illustrated in the Equations below, where:

TABLE 1

| Variable | Definition |
|---|---|
| X, Y, Z | Wheel position in ISO 8855 coordinate |
| $x_i$, $y_i$ | Pixel coordinate of wheel location |
| $X_h$, $Y_h$ | Trailer hitch point location |
| $R_t$ | Rotation part of camera extrinsic |
| t | Transaction vector of camera extrinsic |
| K | Intrinsic matrix of physical camera |
| u, v, w | Pixel coordinates before losing depth information |
| P | Matrix calculated from camera extrinsic and intrinsic |
| $p_1$, $p_2$, $p_3$, $p_4$ | Elements from third row of P matrix, a constant vector |
| W | Width of trailer |
| L | Trailer length (from hitch point to wheel location) |

Various techniques are known for converting 2D position to 3D position, for example:

$$w \begin{bmatrix} x_i \\ y_i \\ 1 \\ 1/w \end{bmatrix} = \begin{bmatrix} u \\ v \\ w \\ 1 \end{bmatrix} = \begin{bmatrix} K & 0_{3\times1} \\ 0_{1\times3} & 1 \end{bmatrix} \begin{bmatrix} R_t & t \\ 0_{1\times3} & 1 \end{bmatrix} \begin{bmatrix} X \\ Y \\ Z \\ 1 \end{bmatrix}. \qquad \text{Equation 1}$$

The intrinsic K and extrinsic matrix R_t, t has different size, therefore cannot be multiplied together directly. The extended form $$\begin{bmatrix} K & 0_{3\times1} \\ 0_{1\times3} & 1 \end{bmatrix}$$

and $$\begin{bmatrix} R_t & t \\ 0_{1\times3} & 1 \end{bmatrix}$$

both have dimension of 4-by-4 allowing the direct multiplication. Multiplying Intrinsic and extrinsic consecutively to the 3D ISO point X, Y, Z will map the point into image space uvw based on computer vision theory. However, people can only see $(x_i, y_i)$ from a 2D screen because the depth information is lost. Thus, Equation 1 defines $u=wx_i$, $v=wy_i$ and w is unknown.

Where $(x_i, y_i)$ is the pixel coordinate and w is the depth information lost during the 3D to 2D projection. Then wheel 2D to 3D reprojection can be done and expressed as the following by multiplying the inverse of $$\begin{bmatrix} K & 0_{3\times1} \\ 0_{1\times3} & 1 \end{bmatrix} \begin{bmatrix} R_t & t \\ 0_{1\times3} & 1 \end{bmatrix}$$

on both sides of the equation because the inverse and transpose of an extrinsic matrix are the same by its property:

$$\begin{bmatrix} X \\ Y \\ Z \\ 1 \end{bmatrix} = \begin{bmatrix} R_t & t \\ 0_{1\times3} & 1 \end{bmatrix}^T \begin{bmatrix} K & 0_{3\times1} \\ 0_{1\times3} & 1 \end{bmatrix}^{-1} \begin{bmatrix} x_i w \\ y_i w \\ w \\ 1 \end{bmatrix}. \qquad \text{Equation 2}$$

In the task of wheel detection, the world coordinate of wheel center of a commercial truck is assumed to always be on the plane Z=500 mm, for the below example. Hence, the w information can be retained by setting $$P = \begin{bmatrix} R_t & t \\ 0_{1\times3} & 1 \end{bmatrix}^T \begin{bmatrix} K & 0_{3\times1} \\ 0_{1\times3} & 1 \end{bmatrix}^{-1} = \begin{bmatrix} \sim & \sim & \sim & \sim \\ \sim & \sim & \sim & \sim \\ p_1 & p_2 & p_3 & p_4 \\ \sim & \sim & \sim & \sim \end{bmatrix}. \qquad \text{Equation 3}$$

Then, $$p_1 x_i w + p_2 y_i w + p_3 w + p_4 = 500, \qquad \text{Equation 4.}$$

which solves:

$$w = \frac{500 - p_4}{p_1 x_i + p_2 y_i + p_3} \qquad \text{Equation 5}$$

Once w is solved, the depth information is retrieved, and the 2D to 3D back projection is possible based upon Equation 2. With reprojected (X, Y) and hitch point position ($X_h$, $Y_h$), the trailer length (block 640) is calculated as $$L = \sqrt{(X - X_h)^2 + (Y - Y_h)^2 - \left(\frac{W}{2}\right)^2} \qquad \text{Equation 6}$$

The estimation system and process described above generates an estimated wheel position with the image generated by the views 102, 104. The CMS controller and/or other vehicle system controllers convert the estimated image position to a corresponding three dimensional real world position and the corresponding three dimensional position can be used as needed.

The method 600 is performed for each detected trailer wheel position. A moving average of the trailer wheel base is calculated (method 700; FIG. 10) as new trailer wheel positions are acquired (block 702). The method 600 is performed for the newly acquired trailer wheel position to calculate the trailer wheel base (L) based upon that newly acquired trailer wheel position (block 704). An average wheel base is calculated based upon a previous average wheel base and the new two-dimensional trailer wheel location (block 706). A simple counter can be used to calculate a moving average of the trailer wheel base, for example:

$$L_{moving\ average} = \frac{L_n + L_{n-1}(n-1)}{n}, \qquad \text{Equation 7}$$

where n is the number of wheel position samples, $L_n$ is the calculated trailer wheel base from the current wheel position, and $L_{n-1}$ is the previously calculated trailer wheel base.

This approach enables the trailer wheel base to be determined efficiently using limited memory while maintaining accuracy. Thus, the new two-dimensional trailer wheel location can be stored in memory briefly to perform the method 600, but can be overwritten immediately subsequent to performing method 600, if desired. The method 700 is sufficiently accurate such that it can be performed repeatedly during a single turn of the trailer, such that a displayed trailer trajectory is reliable enough to be based upon the average wheel base from the single turn.

In one example, the average trailer wheel base can be used to predict the trailer trajectory (block 708) for use by module(s) 100-112. In another example, the average trailer wheel base is provided to an advanced driver assistance system within the vehicle and separate from the CMS system.

The method 700 can also be used to determine the accuracy of one of the rear-facing cameras 20A, 20B compared to the other of the rear-facing cameras 20A, 20B. Thus, for example, the methods 600, 700 are performed independently using each of first and second rear-facing cameras of the multiple rear-facing cameras 20A, 20B. In this manner, a first average wheel base is calculated and associated with one of the cameras 20A, 20B, and a second average wheel base is calculated and associated with the other of the cameras 20A, 20B. The ECU 22 then performs a step of comparing the first and second average wheel bases to one another to determine a positional accuracy of the cameras 20A, 20B. A large discrepancy between the two cameras 20A, 20B may be indicative of one of the cameras being out of position, such that a warning may be given to the operator to have the camera calibration checked.

The CMS includes at least one processor and at least one non-transitory electronic storage medium that stores instructions which when executed cause the CMS to perform the method steps and calculations described herein.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method for determining wheel base for a trailer attached to a tractor, comprising:
   a) identifying a two-dimensional trailer wheel location in an image;
   b) associating the two-dimensional trailer wheel location with a corresponding trailer angle;
   c) converting the two-dimensional trailer wheel location to a three-dimensional trailer wheel location;
   d) calculating a wheel base from the three-dimensional trailer wheel location;
   e) acquiring a new two-dimensional trailer wheel location;
   f) performing steps b)-d) for the new two-dimensional trailer wheel location; and
   g) calculating an average wheel base based upon a previous average wheel base and the new two-dimensional trailer wheel location.

2. The method of claim 1, wherein step a) is performed using a rear-facing camera mounted to a side of a tractor, and the image is provided by the rear-facing camera, and wherein step e) is performed using the same rear-facing camera.

3. The method of claim 1, wherein step b) is performed based upon a kinematic model.

4. The method of claim 3, wherein step b) includes referencing a steering wheel angle with the tractor in a forward gear.

5. The method of claim 3, comprising a step of filtering the two-dimensional trailer wheel location based upon an expected range of wheel locations for the trailer angle.

6. The method of claim 5, wherein the filtering step is performed between step b) and step c).

7. The method of claim 1, wherein step e) includes storing the new two-dimensional trailer wheel location in memory, and comprising a step of permitting the stored new two-dimensional trailer wheel location to be overwritten immediately subsequent to performing step g).

8. The method of claim 1, comprising a step of displaying a trailer trajectory based upon the average wheel base.

9. The method of claim 8, wherein steps b)-g) are performed repeatedly during a single turn of the trailer, and the step of displaying a trailer trajectory is based upon the average wheel base from the single turn.

10. The method of claim 1, wherein step b)-g) are performed independently using each of first and second rear-facing cameras mounted to a side of a tractor providing a first average wheel base associated with the first rear-facing camera and providing a second average wheel base associated with the second rear-facing camera, and comprising a step of comparing the first and second average wheel bases to one another to determine a positional accuracy of at least one of the first and second rear-facing cameras.

11. A camera monitor system (CMS) for determining wheel base for a trailer attached to a tractor, comprising:
   multiple rear-facing cameras configured to capture multiple fields of view in proximity to the trailer;
   multiple displays configured to display images from the captured multiple fields of view;
   a sensor configured to provide information relating to a trailer angle;

a controller in communication with the multiple cameras, the multiple displays and the sensor, the controller including a memory having vehicle configuration parameters, a kinematic model and a trailer wheel location determination module, the controller is programmed to perform a trailer wheel base estimation comprising steps of:

a) identifying a two-dimensional trailer wheel location in an image of one of the multiple fields of view;

b) associating the two-dimensional trailer wheel location with a corresponding trailer angle;

c) converting the two-dimensional trailer wheel location to a three-dimensional trailer wheel location;

d) calculating a wheel base from the three-dimensional trailer wheel location;

e) acquiring a new two-dimensional trailer wheel location;

f) performing steps b)-d) for the new two-dimensional trailer wheel location; and g) calculating an average wheel base based upon a previous average wheel base and the new two-dimensional trailer wheel location.

12. The CMS of claim 11, wherein step a) is performed using one of the multiple rear-facing cameras which is mounted to a side of a tractor, and the image is provided by the one of the multiple rear-facing cameras, and wherein step e) is performed using the same one of the multiple rear-facing cameras.

13. The CMS of claim 11, wherein step b) is performed based upon the kinematic model.

14. The CMS of claim 13, wherein step b) includes referencing a steering wheel angle from the sensor with the tractor in a forward gear.

15. The CMS of claim 13, wherein the controller performs a step of filtering the two-dimensional trailer wheel location based upon an expected range of wheel locations for the trailer angle.

16. The CMS of claim 15, wherein the filtering step is performed between step b) and step c).

17. The CMS of claim 11, wherein step e) includes storing the new two-dimensional trailer wheel location in the memory, and wherein the controller permits the stored new two-dimensional trailer wheel location to be overwritten immediately subsequent to performing step g).

18. The CMS of claim 11, wherein the controller performs a step of displaying on one of the multiple displays a trailer trajectory based upon the average wheel base.

19. The CMS of claim 18, wherein steps b)-g) are performed repeatedly during a single turn of the trailer, and the step of displaying a trailer trajectory is based upon the average wheel base from the single turn.

20. The CMS of claim 11, wherein step b)-g) are performed independently using each of first and second rear-facing cameras of the multiple rear-facing cameras which are mounted to a side of a tractor, wherein a first average wheel base associated with the first rear-facing camera is calculated, and a second average wheel base associated with the second rear-facing camera is calculated, and wherein the controller performs a step of comparing the first and second average wheel bases to one another to determine a positional accuracy of at least one of the first and second rear-facing cameras.

* * * * *